United States Patent
Yun et al.

(10) Patent No.: US 11,646,410 B2
(45) Date of Patent: May 9, 2023

(54) ANODE FOR LITHIUM METAL BATTERY, AND ELECTROCHEMICAL DEVICE COMPRISING SAME

(71) Applicant: LG CHEM, LTD., Seoul (KR)

(72) Inventors: Hyun-Woong Yun, Daejeon (KR); Jong-Keon Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 259 days.

(21) Appl. No.: 16/613,387

(22) PCT Filed: Dec. 7, 2018

(86) PCT No.: PCT/KR2018/015565
§ 371 (c)(1),
(2) Date: Nov. 13, 2019

(87) PCT Pub. No.: WO2019/112389
PCT Pub. Date: Jun. 13, 2019

(65) Prior Publication Data
US 2020/0168902 A1    May 28, 2020

(30) Foreign Application Priority Data
Dec. 7, 2017 (KR) .......................... 10-2017-0167577

(51) Int. Cl.
*H01M 4/36*   (2006.01)
*H01M 4/134*  (2010.01)
(Continued)

(52) U.S. Cl.
CPC ......... *H01M 4/366* (2013.01); *H01M 4/0407* (2013.01); *H01M 4/134* (2013.01);
(Continued)

(58) Field of Classification Search
CPC .. H01M 4/366; H01M 4/0407; H01M 4/8657; H01M 10/052; H01M 4/134; H01M 4/628
See application file for complete search history.

(56) References Cited

U.S. PATENT DOCUMENTS

2004/0029014 A1    2/2004  Hwang et al.
2005/0089759 A1    4/2005  Hwang et al.
(Continued)

FOREIGN PATENT DOCUMENTS

JP    5-266894 A     10/1993
JP    2001-357843 A  12/2001
(Continued)

OTHER PUBLICATIONS

International Search Report issued in PCT/KR2018/015565 (PCT/ISA/210), dated Mar. 18, 2019.

*Primary Examiner* — Jeremiah R Smith
(74) *Attorney, Agent, or Firm* — Birch, Stewart, Kolasch & Birch, LLP

(57) ABSTRACT

A negative electrode for a lithium metal battery which includes: a current collector; a negative electrode active material layer formed on the surface of a current collector; a heat conductive layer formed on a surface of the negative electrode active material layer wherein the heat conductive layer comprises a heat conductive material having a heat conductivity of 25 W/m·K to 500 W/m·K; and a protective layer formed on a surface of the heat conductive layer, wherein the protective layer includes at least one of a porous polymer layer and a ceramic layer. An electrochemical device including the negative electrode for a lithium metal battery. The negative electrode for a lithium metal battery includes a heat conductive layer and a protective layer, and can inhibit growth of lithium dendrite in a negative electrode (Continued)

for a lithium metal battery and improve the cycle life of an electrochemical device.

12 Claims, 2 Drawing Sheets

(51) Int. Cl.
    *H01M 4/62*     (2006.01)
    *H01M 10/052*     (2010.01)
    *H01M 4/04*     (2006.01)
    *H01M 4/02*     (2006.01)
    *H01M 4/86*     (2006.01)
    *H01M 10/0525*     (2010.01)

(52) U.S. Cl.
    CPC ......... *H01M 4/628* (2013.01); *H01M 10/052* (2013.01); *H01M 4/8657* (2013.01); *H01M 10/0525* (2013.01); *H01M 2004/021* (2013.01); *H01M 2004/027* (2013.01)

(56) References Cited

U.S. PATENT DOCUMENTS

| | | |
|---|---|---|
| 2005/0095504 A1 | 5/2005 | Kim et al. |
| 2007/0082261 A1 | 4/2007 | Lee et al. |
| 2010/0248026 A1* | 9/2010 | Hinoki ................. H01M 50/46 429/209 |
| 2014/0295263 A1 | 10/2014 | Iwama et al. |
| 2015/0050533 A1 | 2/2015 | Nam et al. |
| 2017/0187075 A1* | 6/2017 | Fanous ............... H01M 10/052 |
| 2017/0309899 A1 | 10/2017 | Son et al. |
| 2017/0346099 A1 | 11/2017 | Choi et al. |
| 2018/0083269 A1* | 3/2018 | Iwasaki ............... H01M 4/5825 |

FOREIGN PATENT DOCUMENTS

| | | |
|---|---|---|
| JP | 2008-282558 A | 11/2008 |
| JP | 2013-149434 A | 8/2013 |
| JP | 2014-191912 A | 10/2014 |
| KR | 10-2004-0013585 A | 2/2004 |
| KR | 10-2005-0038905 A | 4/2005 |
| KR | 10-2005-0041661 A | 5/2005 |
| KR | 10-0686848 B1 | 2/2007 |
| KR | 10-2015-0020022 A | 2/2015 |
| KR | 10-2017-0086003 A | 7/2017 |
| KR | 10-2017-0126404 A | 11/2017 |
| KR | 10-2017-0134036 A | 12/2017 |

\* cited by examiner

ANODE FOR LITHIUM METAL BATTERY, AND ELECTROCHEMICAL DEVICE COMPRISING SAME

TECHNICAL FIELD

The present disclosure relates to a negative electrode for a lithium metal battery which can be used for an electrochemical device, such as a lithium metal battery. More particularly, the present disclosure relates to a negative electrode for a lithium metal battery including a protective layer.

The present application claims priority to Korean Patent Application No. 10-2017-0167577 filed on Dec. 7, 2017 in the Republic of Korea, the disclosures of which are incorporated herein by reference.

BACKGROUND ART

Recently, energy storage technology has been given increasing attentions. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. Recently, when developing such batteries, research and development for designing novel electrodes and batteries have been conducted in order to improve capacity density and specific energy.

Among the commercially available secondary batteries, lithium secondary batteries developed in the early 1990's have been spotlighted, since they have a higher operating voltage and significantly higher energy density as compared to conventional batteries, such as Ni—MH batteries, N—Cd batteries and sulfuric acid-lead batteries using an aqueous electrolyte.

Typically, such lithium secondary batteries may be classified into lithium metal batteries, lithium ion batteries and lithium polymer batteries. Among these, lithium metal batteries use lithium metal or a lithium alloy as a negative electrode. Particularly, lithium metal is advantageous in that it can provide the highest energy density, and thus continuous studies have been conducted about lithium metal as a negative electrode.

However, a lithium metal battery has a problem in that dendrite is formed on the negative electrode surface as charge/discharge is repeated to cause an increase in electrode thickness and degradation of cycle characteristics.

DISCLOSURE

Technical Problem

Therefore, the present disclosure is directed to providing a negative electrode for a lithium metal battery which inhibits growth of dendrite and allows homogeneous formation of dendrite over the whole surface of a negative electrode even when dendrite is grown.

The present disclosure is also directed to providing a negative electrode for a lithium metal battery which has improved cycle life.

In addition, the present disclosure is directed to providing an electrochemical device including the negative electrode.

It will be easily understood that the objects and advantages of the present disclosure may be realized by the means shown in the appended claims and combinations thereof.

Technical Solution

In one aspect of the present disclosure, there is provided a negative electrode according to any one of the following embodiments.

According to the first embodiment, there is provided a negative electrode for a lithium metal battery which includes:

a current collector a negative electrode active material layer formed on a surface of the current collector;

a heat conductive layer formed on a surface of the negative electrode active material layer, the heat conductive layer comprising a heat conductive material having a heat conductivity of 25 W/m·K to 500 W/m·K; and a protective layer formed on a surface of the heat conductive layer, wherein the protective layer includes at least one of a porous polymer layer and a ceramic layer.

According to the fourth embodiment, there is provided the negative electrode for a lithium metal battery as defined in any one of the first to the third embodiments, wherein the protective layer consists of a ceramic layer formed on a porous polymer layer.

According to the fifth embodiment, there is provided the negative electrode for a lithium metal battery as defined in any one of the first to the fourth embodiments, wherein the protective layer consists of a porous polymer layer formed on a ceramic layer.

According to the sixth embodiment, there is provided the negative electrode for a lithium metal battery as defined in any one of the first to the fifth embodiments, wherein the heat conductive material is a heat conductive inorganic material.

According to the seventh embodiment, there is provided the negative electrode for a lithium metal battery as defined in any one of the first to the sixth embodiments, wherein the heat conductive inorganic material includes at least one selected from the group consisting of boron nitride, magnesium oxide, aluminum oxide, beryllium oxide, aluminum nitride and combinations thereof.

According to the eighth embodiment, there is provided the negative electrode for a lithium metal battery as defined in any one of the first to the seventh embodiments, wherein the porous polymer layer includes a polymer, and the polymer is at least one selected from the group consisting of polyvinylidene fluoride, polyvinyl chloride, polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinylidene fluoride, polyvinyl acetate, polyethylene, polypropylene, polyethylene-co-vinyl acetate, polyethylene oxide, polypropylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan, carboxymethyl cellulose and combinations thereof.

According to the ninth embodiment, there is provided the negative electrode for a lithium metal battery as defined in any one of the first to the eighth embodiments, wherein the ceramic layer includes inorganic particles, and the inorganic particle is at least one selected from the group consisting of $SiO_2$, $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_{3-x}$Pb- TiO$_3$ (PMNPT, 0<x<1), hafnia (HfO$_2$), SrTiO$_3$, SnO$_2$, CeO$_2$, MgO, NiO, CaO, ZnO, ZrO$_2$, Y$_2$O$_3$, Al$_2$O$_3$, AlO(OH), LLZO (Lithium Lanthanum Zirconium Oxide), ZO$_3$, Si$_3$N$_4$, TiC, TiO$_2$, SiC and combinations thereof.

According to the tenth embodiment, there is provided the negative electrode for a lithium metal battery as defined in any one of the first to the ninth embodiments, wherein the ceramic layer includes inorganic particles, and the inorganic particles have a Vicker's hardness of 10 GPa or more.

According to the eleventh embodiment, there is provided the negative electrode for a lithium metal battery as defined in any one of the first to the tenth embodiments, wherein the negative electrode active material layer includes, as a negative electrode active material, at least one selected from alkali metals, alkaline earth metals, Group 3B metals, transition metals and combinations thereof.

According to the twelfth embodiment, there is provided the negative electrode for a lithium metal battery as defined in any one of the first to the eleventh embodiments, wherein the heat conductive layer has a thickness of 1-10 μm.

According to the thirteenth embodiment, there is provided the negative electrode for a lithium metal battery as defined in any one of the first to the twelfth embodiments, wherein the porous polymer layer has a thickness of 1-10 μm.

According to the fourteenth embodiment, there is provided the negative electrode for a lithium metal battery as defined in any one of the first to the thirteenth embodiments, wherein the ceramic layer has a thickness of 1-10 μm.

According to the fifteenth embodiment, there is provided the negative electrode for a lithium metal battery as defined in any one of the first to the fourteenth embodiments, wherein the heat conductive material has a heat conductivity of 30 W/m·K to 200 W/m·K.

In another aspect of the present disclosure, there is also provided an electrochemical device according to any one of the following embodiments.

According to the sixteenth embodiment, there is provided an electrochemical device including the negative electrode as defined in any one of the first to the fifteenth embodiments.

According to the seventeenth embodiment, there is provided the electrochemical device as defined in the sixteenth embodiment, which is a lithium metal battery.

According to the eighteenth embodiment, there is provided the electrochemical device as defined in the seventeenth embodiment, wherein the lithium metal battery includes, as a negative electrode active material, at least one selected from alkali metals, alkaline earth metals, Group 3B metals, transition metals and combinations thereof.

Advantageous Effects

The negative electrode for a lithium metal battery according to the present disclosure includes a heat conductive layer disposed on the surface of a negative electrode active material layer, and thus heat distribution can be maintained homogeneously on the negative electrode surface. Thus, lithium dendrite can be grown homogeneously on the negative electrode surface. As a result, the negative electrode for a lithium metal battery according to the present disclosure improves the problems, such as an increase in thickness of an electrode assembly and degradation of life characteristics, caused by non-homogeneous growth of dendrite, and thus can provide an electrochemical device with improved safety and life characteristics.

BEST MODE

Figure 1:
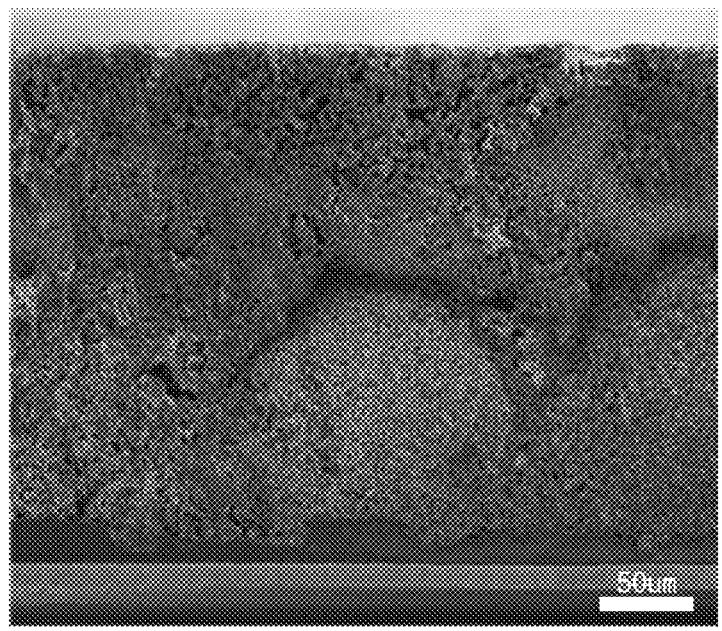
FIG. 1 shows a scanning electron microscopic (SEM) image illustrating the section of the negative electrode according to Comparative Examples.

Hereinafter, preferred embodiments of the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Throughout the specification, the expression 'a part [includes] an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In one aspect, there is provided a negative electrode for a lithium metal battery and an electrochemical device including the same.

A lithium metal battery using lithium metal or a lithium alloy has an advantage of high energy density.

However, a lithium metal battery is problematic in that dendrite is formed on the surface of a negative electrode while repeating charge/discharge to cause degradation of cycle characteristics and an increase in electrode thickness.

To solve the above-mentioned problem, the negative electrode for a lithium metal battery according to an embodiment of the present disclosure includes: a negative electrode active material layer formed on the surface of a current collector; a heat conductive layer formed on the surface of the negative electrode active material layer and comprising a heat conductive material having a heat conductivity of 25 W/m·K to 500 W/m·K; and a protective layer formed on the surface of the heat conductive layer, wherein the protective layer includes at least one of a porous polymer layer and a ceramic layer.

The negative electrode for a lithium metal battery according to the present disclosure includes a heat conductive layer having excellent heat conductivity and formed on the surface of the negative electrode active material layer. The heat conductive layer functions to interrupt lithium from an electrolyte during charge/discharge of the lithium metal battery and increases mechanical strength of the negative electrode to inhibit growth of dendrite. As a result, it is possible to maintain a constant electrode thickness and to overcome the problem of an increase in surface area of the negative electrode.

In addition, when a lithium metal battery undergoes charge/discharge continuously, lithium metal is dissolved and deposited continuously to generate heat. Herein, the heat conductive layer allows the generated heat to be transferred uniformly to the whole surface of the negative electrode active material layer. When heat distribution on the negative electrode active material surface becomes uniform during the operation of a lithium metal battery, lithium dendrite is grown homogeneously on the negative electrode surface. As a result, it is possible to improve the cycle characteristics of the lithium metal battery.

Therefore, the electrochemical device including the negative electrode for a lithium metal battery according to the present disclosure has improved safety and life characteristics.

Meanwhile, it is preferred that the heat conductive layer directly faces the negative electrode active material layer. This is because the heat conductive layer inhibits growth of lithium dendrite, and helps homogeneous growth even when lithium dendrite is grown.

According to an embodiment of the present disclosure, the negative electrode includes a current collector which supports the negative electrode active material layer and is in contact with the negative electrode active material layer to transport electrons between the negative electrode active material and electric wires.

The current collector is not particularly limited, as long as it causes no chemical change in the corresponding battery and has conductivity. Particular examples of the current collector may include stainless steel; aluminum; nickel; titanium; baked carbon; copper; stainless steel surface-treated with carbon, nickel, titanium or silver; aluminum-cadmium alloys; or the like. The current collector may have various shapes, such as a film, sheet, foil, net, porous body, foam and a non-woven web body, and may optionally have surface irregularities formed on the surface thereof.

The current collector may have a thickness of 5 μm to 30 μm. According to an embodiment of the present disclosure, the current collector may have a thickness of 5 μm or more, 7 μm or more, or 10 μm or more, within the above-defined range. In addition, the current collector may have a thickness of 30 μm or less, 25 μm or less, or 20 μm or less, within the above-defined range. For example, the current collector may have a thickness of 5 μm to 25 μm, or 7 μm to 30 μm. Within the above-defined range, the negative electrode active material layer may be supported by the current collector, and the problem of a decrease in energy density per volume of negative electrode may be improved.

According to an embodiment of the present disclosure, the negative electrode for a lithium metal battery includes a negative electrode active material layer disposed on the current collector. The negative electrode active material layer may include at least one selected from the group consisting of alkali metals, alkaline earth metals, Group 3B metals and transition metals. Non-limiting examples of the alkali metals include any one selected from the group consisting of lithium (Li), sodium (Na), potassium (K), rubidium (Rb), cesium (Cs) and francium (Fr). Non-limiting examples of the alkaline earth metals include any one selected from the group consisting of beryllium (Be), magnesium (Mg), calcium (Ca), strontium (Sr), barium (Ba) and radium (Ra). Non-limiting examples of the Group 3B metals include any one selected from the group consisting of aluminum (Al), gallium (Ga), indium (In) and thallium (Tl). Non-limiting examples of the transition metals include any one selected from the group consisting of nickel (Ni), copper (Cu), zinc (Zn), cobalt (Co), manganese (Mn) and chromium (Cr).

According to an embodiment of the present disclosure, the negative electrode active material layer may include at least one selected from metal foil, metal alloy and powder thereof.

According to an embodiment of the present disclosure, the negative electrode active material may include lithium metal and may further include at least one selected from the group consisting of a lithium alloy, lithium metal composite oxides, lithium-containing titanium composite oxides (LTO) and combinations thereof. Herein, the lithium alloy includes an element capable of forming alloy with lithium, wherein the element capable of forming alloy with lithium may include Si, Sn, C, Pt, Ir, Ni, Cu, Ti, Na, K, Rb, Cs, Fr, Be, Mg, Ca, Sr, Sb, Pb, In, Zn, Ba, Ra, Ge, Al or alloys thereof.

The negative electrode active material layer may have a thickness of 5 μm to 40 μm. According to an embodiment of the present disclosure, the negative electrode active material layer may have a thickness of 5 μm or more, 7 μm or more, or 10 μm or more, within the above-defined range. In addition, the negative electrode active material layer may have a thickness of 40 μm or less, 30 μm or less, or 20 μm or less, within the above-defined range. For example, the thickness may be 5 μm to 30 μm, or 7 μm to 40 μm. Within the above-defined range, it is possible for lithium ions to be diffused sufficiently into the negative electrode active material layer.

According to an embodiment of the present disclosure, the negative electrode active material layer may be obtained by coating, binding, pressing or vapor depositing metal foil onto a planar current collector. In a variant, the negative electrode active material layer may be obtained by applying metal powder onto a current collector. Meanwhile, the negative electrode active material layer may include metal foil or a metal alloy alone, without any current collector. According to an embodiment of the present disclosure, the negative electrode active material layer may be obtained by physically binding or pressing lithium metal to a current collector. According to an embodiment of the present disclosure, the negative electrode active material layer may be obtained by carrying out electrodeposition or chemical vapor deposition of lithium metal on a current collector.

According to an embodiment of the present disclosure, the negative electrode for a lithium metal battery includes a heat conductive layer formed on the surface of the negative electrode active material layer in order to protect the negative electrode active material layer, to make heat distribution homogeneous on the negative electrode surface, and thus to allow homogeneous growth of lithium dendrite. The heat conductive layer includes a heat conductive material having a heat conductivity of 25 W/m·K to 500 W/m·K. Although the heat conductive material is not particularly limited, it preferably includes a heat conductive inorganic material. FIG. 1 shows a scanning electron microscopic (SEM) image illustrating the section of the negative electrode according to Comparative Examples. Referring to FIG. 1, the negative electrode for a lithium metal battery having no heat conductive layer shows non-homogeneous growth of lithium dendrite, and thus shows an increase in thickness of the negative electrode compared to Examples as shown in FIG. 2 and FIG. 3.

Figure 2:
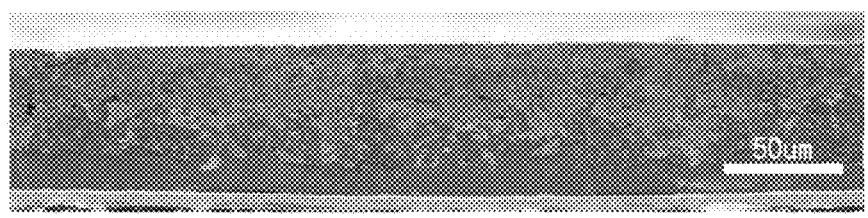
FIG. 2 and FIG. 3 show SEM images illustrating the section of the negative electrode according to an embodiment of the present disclosure.
Figure 3:
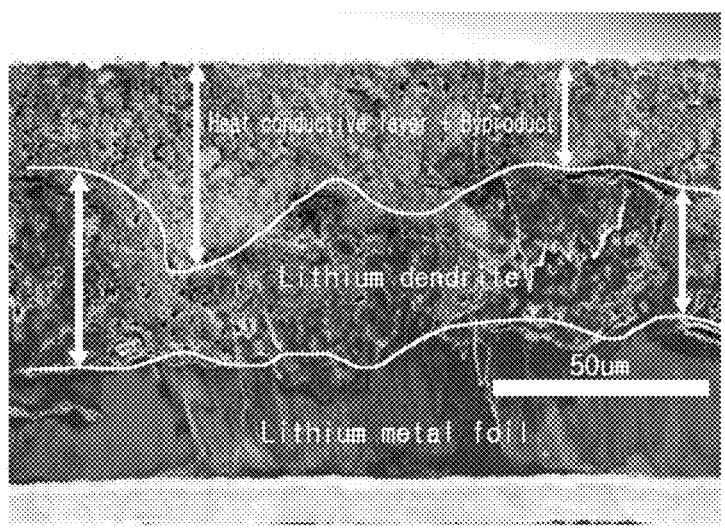

FIG. 2 and FIG. 3 show SEM images of the section of the negative electrode according to Examples. Referring to FIG. 2 and FIG. 3, the negative electrode having a heat conductive layer according to the present disclosure allows homogeneous growth of lithium dendrite and formation of a dendrite structure, when lithium dendrite is grown on the lithium metal negative electrode active material layer.

According to the present disclosure, the heat conductive material means one having a heat conductivity of 25 W/m·K to 500 W/m·K, wherein the heat conductivity is an index representing heat transfer of a material and can be expressed in the unit of K or W/m·K. A higher index of heat conductivity means more rapid heat transfer and lower heat insulation property. The heat conductivity may be determined by various methods, such as a hot wire method, a guarded heat flow method, a hot plate method, a laser flash method or a laser pulse method.

According to an embodiment of the present disclosure, the heat conductive material may have a heat conductivity of 30 W/m·K to 200 W/m·K.

According to an embodiment of the present disclosure, the heat conductive inorganic material may be any one selected from the group consisting of boron nitride (BN), magnesium oxide (MgO), aluminum oxide ($Al_2O_3$), beryllium oxide (BeO), aluminum nitride (AlN), silicon carbide (SiC) and combinations thereof.

Particularly, it is preferred to use boron nitride or aluminum nitride with a view to reducing heat shrinkage and increasing cycle life.

According to an embodiment of the present disclosure, boron nitride has a heat conductivity of about 200 W/m·K. According to an embodiment of the present disclosure, magnesium oxide has a heat conductivity of about 40 W/m·K. According to an embodiment of the present disclosure, aluminum oxide has a heat conductivity of about 30 W/m·K. According to an embodiment of the present disclosure, aluminum nitride has a heat conductivity of about 180 W/m·K. According to an embodiment of the present disclosure, silicon carbide has a heat conductivity of about 100 W/m·K.

The heat conductive layer preferably includes a heat conductive material in an amount of 50 wt % or more based on 100 wt % of the total weight of the heat conductive layer. Within the above-defined range, homogeneous heat distribution may occur on the negative electrode surface and lithium dendrite grows homogeneously.

Although there is no particular limitation in diameter of the heat conductive inorganic material, the diameter may be 0.1 μm to 1 μm. According to an embodiment of the present disclosure, the heat conductive inorganic material may have a diameter of 0.1 μm or more, 0.2 μm or more, or 0.5 μm or more, within the above-defined range, and it may have a diameter of 1 μm or less, 0.9 μm or less, or 0.7 μm or less, within the above-defined range. For example, the heat conductive inorganic material may have a diameter of 0.1 μm to 0.7 μm, or 0.2 μm to 0.9 μm. Within the above-defined range, the heat conductive inorganic material has a diameter suitable for inducing homogeneous growth of dendrite, and thus it is possible for the heat conductive layer to maintain an adequate thickness.

Although the thickness of the heat conductive layer is not particularly limited, it may be 1 μm to 10 μm. According to an embodiment of the present disclosure, the heat conductive layer may have a thickness of 1 μm or more, 1.5 μm or, or 2 μm or more, within the above-defined range, and it may have a thickness of 10 μm or less, 7 μm or less, or 5 μm or less, within the above-defined range. For example, the heat conductive layer may have a thickness of 1 μm to 7 μm, or 1.5 μm to 10 μm. Within the above-defined range, it is possible for the heat conductive layer to transfer heat generated from the negative electrode active material sufficiently, and it is possible to inhibit growth of lithium dendrite while preventing an increase in interfacial resistance.

According to an embodiment of the present disclosure, there is no particular limitation in the method for forming a heat conductive layer on the surface of a negative electrode active material layer. Any method currently used in the art may be used with no particular limitation depending on materials forming the heat conductive layer. For example, it is possible to use conventional methods for forming a layer, such as a doctor blade process, solution casting process, dip coating process, spray coating process, spin coating process, sputtering process based on physical vapor deposition (PVD), atomic layer deposition (ALD) process based on chemical vapor deposition (CVD), or the like.

According to an embodiment of the present disclosure, the negative electrode for a lithium metal battery includes a protective layer formed on the surface of the heat conductive layer in order to inhibit growth of dendrite secondarily, to protect the negative electrode active material layer and heat conductive layer, and to improve the other characteristics of the negative electrode for a lithium metal battery. The protective layer may include at least one of a porous polymer layer and a ceramic layer. The negative electrode for a lithium metal battery according to the present disclosure including the protective layer on the surface of the heat conductive layer shows high capacity maintenance and low swelling (phenomenon of electrode swelling). In addition to above-described effects, the negative electrode for a lithium metal battery according to the present disclosure has high heat conductivity and a high electrolyte impregnation ratio.

According to an embodiment of the present disclosure, the protective layer may include at least one of a porous polymer layer and a ceramic layer.

According to an embodiment of the present disclosure, the protective layer may include a porous polymer layer. According to an embodiment of the present disclosure, the protective layer may include a ceramic layer. According to an embodiment of the present disclosure, the protective layer may include both a porous polymer layer and a ceramic layer.

According to an embodiment of the present disclosure, the protective layer may include a porous polymer layer.

The porous polymer layer having a porous structure facilitates introduction of an electrolyte into a negative electrode active material layer, and can retain an electrolyte sufficiently therein when injecting the electrolyte after the manufacture of an electrode assembly. Since the porous polymer layer retains the electrolyte therein sufficiently, it is possible to delay depletion of the electrolyte during the operation of a lithium metal battery, and thus can delay degradation of the life of a lithium metal battery.

According to an embodiment of the present disclosure, the porous polymer layer includes a polymer, and particular examples of the polymer may include any one selected from the group consisting of polyvinylidene fluoride, polyvinyl chloride, polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinylidene fluoride, polyvinyl acetate, polyethylene, polypropylene, polyethylene-co-vinyl acetate, polyethylene oxide, polypropylene oxide, polyarylate, cellulose acetate, cellulose acetate butyrate, cellulose acetate propionate, cyanoethyl pullulan, cyanoethylpolyvinyl alcohol, cyanoethyl cellulose, cyanoethyl sucrose, pullulan, carboxymethyl cellulose and combinations thereof.

According to an embodiment of the present disclosure, the porous polymer layer may include polyethylene oxide; a fluoro-polymer, such as polyvinylidene fluoride or polyvinylidene fluoride-co-hexafluoropropylene, or the like, with a view to electrolyte holdability.

According to an embodiment of the present disclosure, the pores formed on the porous polymer layer may have a pore size of 0.01 µm to 10 µm and a porosity of 5-95%.

Although there is no particular limitation in the thickness of the porous polymer layer, the porous polymer layer may have a thickness of 1 µm to 10 µm. According to an embodiment of the present disclosure, the porous polymer layer may have a thickness of 1 µm or more, 1.5 µm or more, or 2 µm or more, within the above-defined range, and it may have a thickness of 10 µm or less, 7 µm or less, or 5 µm or less, within the above-defined range. For example, the porous polymer layer may have a thickness of 1 µm to 7 or 1.5 µm to 10 µm. Within the above-defined range, the porous polymer layer can retain an electrolyte sufficiently to delay depletion of the electrolyte during the operation of an electrode assembly and to improve the life of a lithium metal battery.

According to an embodiment of the present disclosure, the porous polymer layer may have porosity through any method with no particular limitation. For example, a polymer film having pores may be formed through a dry process or a wet process, or pores may be formed through a phase separation process or phase conversion process.

According to an embodiment of the present disclosure, the method for forming a porous polymer layer through a phase separation process may be carried out as follows. The porous structure of the porous polymer layer may be prepared as described hereinafter. First, polyvinylidene as a polymer is added to acetone functioning as a solvent to prepare a polymer solution having a solid content of 10 wt %. Next, water or ethanol is added as a non-solvent to the solution prepared as described above in an amount of 2-10 wt %, thereby providing a polymer solution.

According to an embodiment of the present disclosure, the polymer solution may be applied onto the heat conductive layer. According to another embodiment of the present disclosure, the polymer solution may be applied onto the ceramic layer.

While phase conversion occurs during the evaporation of the polymer solution after coating, the regions occupied by the non-solvent in the portion where the non-solvent is phase-separated from the polymer become pores. Therefore, it is possible to control pore size depending on the solubility of each of the non-solvent and polymer and the content of the non-solvent.

According to an embodiment of the present disclosure, the protective layer may include a ceramic layer. The ceramic layer includes inorganic particles having high mechanical strength, and thus physically inhibits growth of dendrite in a lithium metal battery and secondarily inhibits growth of dendrite whose growth is not inhibited in the heat conductive layer.

According to an embodiment of the present disclosure, the inorganic particles are not particularly limited, as long as they are electrochemically stable. In other words, the inorganic particles are not particularly limited, as long as they cause no oxidation and/or reduction in the operating voltage range (e.g. 0-5V based on Li/Li$^+$) of an applicable electrochemical device. Particularly, when using inorganic particles having a high dielectric constant, they contribute to an increase in dissociation degree of the electrolyte salt, particularly lithium salt, in a liquid electrolyte, and thus can improve ion conductivity of the electrolyte.

For these reasons, the inorganic particles may include inorganic particles having a dielectric constant of 5 or more, inorganic particles capable of transporting lithium ions or a mixture thereof.

The inorganic particles having a dielectric constant of 5 or more may include at least one selected from the group consisting of $Al_2O_3$, $SiO_2$, $ZrO_2$, $AlO(OH)$, $TiO_2$, $BaTiO_3$, $Pb(Zr_xTi_{1-x})O_3$(PZT, wherein $0<x<1$), $Pb_{1-x}La_xZr_{1-y}Ti_yO_3$ (PLZT, wherein $0<x<1$, $0<y<1$), $(1-x)Pb(Mg_{1/3}Nb_{2/3})O_{3-x}$—$PbTiO_3$ (PMN-PT, wherein $0<x<1$), hafnia ($HfO_2$), $SrTiO_3$, $SnO_2$, $CeO_2$, $MgO$, $NiO$, $CaO$, $ZnO$, $ZO_3$, $SiC$ and combinations thereof.

Particular examples of the inorganic particles capable of transporting lithium ions include at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$), $P_2S_5$-based glass ($Li_xP_yS_z$, $0<x<3$, $0<y<3$, $0<z<7$), and combinations thereof. The inorganic particles have a Vicker's hardness of at least 10 Pa. According to an embodiment of the present disclosure, $Al_2O_3$ has a Vicker's hardness of about 17.2-17.5 GPa. According to an embodiment of the present disclosure, $ZrO_2$ has a Vicker's hardness of about 1.25-13 GPa. According to an embodiment of the present disclosure, SiC has a Vicker's hardness of about 21-22 GPa. According to an embodiment of the present disclosure, $Si_3N_4$ has a Vicker's hardness of about 14 GPa. According to an embodiment of the present disclosure, TiC has a Vicker's hardness of about 18.6 GPa.

Vicker's hardness is determined by a standard method for measuring hardness of a material, wherein the extent engraved by a pyramid-shaped diamond indenter is calculated to determine the hardness of a material.

There is no particular limitation in average particle diameter of the inorganic particles. However, the inorganic particles preferably have an average particle diameter of 0.001 µm to 10 µm with a view to formation of a ceramic layer having a uniform thickness and adequate porosity.

Although there is no particular limitation in the thickness of the ceramic layer, the ceramic layer may have a thickness of 1 µm to 10 µm. The ceramic layer may have a thickness of 1 µm or more, 1.5 µm or more, or 2 µm or more, within the above-defined range, and it may have a thickness of 10 µm or less, 7 µm or less, or 5 µm or less, within the above-defined range. For example, the ceramic layer may have a thickness of 1 µm to 10 µm, or 1.5 µm to 7 µm. Within the above-defined range, the ceramic layer can inhibit growth of lithium dendrite and provide higher energy density as compared to the thickness of the conventional lithium metal battery.

According to an embodiment of the present disclosure, the method for forming the ceramic layer on the surface of the heat conductive layer is not particularly limited and any method used currently in the art may be used depending on materials forming the ceramic layer. The ceramic layer may be formed by preparing slurry by mixing inorganic particles, a binder resin and a solvent, and applying the slurry through a doctor blade process, solution casting process, dip coating process, spray coating process, spin coating process, sputtering process based on physical vapor deposition (PVD), atomic layer deposition (ALD) process based on chemical vapor deposition (CVD), or the like.

According to an embodiment of the present disclosure, the slurry for forming a ceramic layer may be applied onto the surface of the heat conductive layer. According to another embodiment of the present disclosure, the slurry for forming a ceramic layer may be applied onto the porous polymer layer.

According to an embodiment of the present disclosure, the protective layer may include a ceramic layer on a porous polymer layer. According to an embodiment of the present disclosure, the protective layer may be obtained by stacking a ceramic layer on a porous polymer layer successively. Therefore, according to an embodiment of the present disclosure, the negative electrode for a lithium metal battery may include: a negative electrode active material layer formed on the surface of a current collector; a heat conductive layer formed on the surface of the negative electrode active material layer and including a heat conductive material having a heat conductivity of 25-500 W/m·K; a porous polymer layer formed on the surface of the heat conductive layer; and a ceramic layer formed on the surface of the porous polymer layer.

As described above, when stacking the heat conductive layer, porous polymer layer and ceramic layer successively, it is possible for the heat conductive layer to inhibit growth of dendrite and to allow homogeneous formation of dendrite if any dendrite is formed. In addition, the porous structure in the porous polymer layer can be impregnated with an electrolyte to improve the life of a lithium metal battery. Further, since the ceramic layer includes inorganic particles having high mechanical strength, it is possible to further inhibit growth of dendrite. Meanwhile, since the polymer in the porous polymer layer has adhesive property, it is preferred for lamination of the heat conductive layer with the ceramic layer.

According to an embodiment of the present disclosure, when the protective layer includes both a ceramic layer and a porous polymer layer, the porous polymer layer is disposed so that it directly faces the heat conductive layer, with a view to life characteristics. Particularly, when the porous polymer layer is an inner layer, not the outermost layer, it is possible to prevent degradation of the effect provided by the protective layer caused by dissolution of the porous polymer layer, and thus to provide significantly high life characteristics.

According to an embodiment of the present disclosure, the protective layer may include a porous polymer layer formed on a ceramic layer. Therefore, according to an embodiment of the present disclosure, the negative electrode for a lithium metal battery may include: a negative electrode active material layer formed on the surface of a current collector; a heat conductive layer formed on the surface of the negative electrode active material layer and including a heat conductive material having a heat conductivity of 25-500 W/m·K; a ceramic layer formed on the surface of the heat conductive layer; and a porous polymer layer formed on the surface of the ceramic layer, stacked successively.

Since the negative electrode for a lithium metal battery includes the heat conductive layer, ceramic layer and the porous polymer layer on the negative electrode active material layer, it is possible to inhibit growth of lithium dendrite, to provide high electrolyte impregnation property, and thus to provide a lithium metal battery having improved cycle life.

The negative electrode for a lithium metal battery according to an embodiment of the present disclosure may be obtained by any conventional method used currently in the art. According to an embodiment of the present disclosure, a negative electrode current collector is prepared and lithium metal is pressed on the negative electrode current collector. Next, slurry for forming a heat conductive layer including a heat conductive material is applied onto lithium metal and dried to form a heat conductive layer. Then, a polymer solution containing a polymer dissolved in a solvent is mixed with a non-solvent, and the resultant mixture is applied onto the heat conductive layer and dried to form a porous polymer layer having a plurality of pores. Finally, a ceramic solution in which ceramic particles are dispersed is applied onto the porous polymer layer and dried to obtain a negative electrode for a lithium metal battery having a ceramic layer formed thereon.

The electrochemical device according to an embodiment of the present disclosure includes an electrode assembly to which an electrolyte is injected, wherein the electrode assembly includes the negative electrode for a lithium metal battery according to an embodiment of the present disclosure.

The electrochemical device may be a lithium metal battery including lithium metal as a negative electrode active material.

The positive electrode used in combination with the negative electrode for a lithium metal battery according to the present disclosure is not particularly limited, and may be obtained by binding a positive electrode active material to a positive electrode current collector according to the conventional method known to those skilled in the art. Non-limiting examples of the positive electrode active material include any conventional positive electrode active materials that may be used for positive electrodes for conventional electrochemical devices, and particular examples thereof include lithium manganese oxides, lithium cobalt oxides, lithium nickel oxides, lithium iron oxides or lithium composite oxides prepared from combinations thereof.

The separator that may be used for the electrochemical device according to the present disclosure is not particularly limited, as long as it performs electrical insulation between the negative electrode and the positive electrode. According to an embodiment of the present disclosure, the separator may include a thin insulation film interposed between the positive electrode and the negative electrode and having high ion permeability and mechanical strength. The separator generally has a pore diameter of 0.01 μm to 10 μm and a thickness of 5 μm to 300 μm. Particular examples of the separator may include sheets or non-woven webs made of chemically resistant and hydrophobic polyolefinic polymers, such as polyethylene and polypropylene, glass fibers, polyethylene, or the like. Optionally, an inorganic coating layer including inorganic particles may be further formed on the outermost surface of the separator in order to increase the heat resistance and stability of the separator.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

1) Manufacture of Positive Electrode

First, 96 g of $LiCoO_2$ as a positive electrode active material, 2 g of polyvinylidene fluoride (PVDF) as a binder and 2 g of carbon black as a conductive material were added to 100 mL of N-methyl pyrrolidone as a solvent, followed by mixing, to obtain positive electrode slurry. The resultant positive electrode slurry was applied to aluminum foil (thickness 15 μm) as a positive electrode current collector to a capacity of 3 mAh/cm², and then dried at 130° C. for 2 hours to obtain a positive electrode.

2) Manufacture of Negative Electrode

Lithium metal foil having a thickness of 20 μm was stacked on copper foil having a thickness of 20 μm as a negative electrode current collector at 100° C. under 0.5 MPa to form a negative electrode active material layer formed on the surface of the current collector.

Next, slurry for forming a heat conductive layer was applied onto the negative electrode active material layer by using a doctor blade and dried at a temperature of 60° C. for 3 hours to form a heat conductive layer. The slurry for forming a heat conductive layer was prepared as follows. First, 500 mL of N-methyl pyrrolidone solution containing polyvinylidene fluoride dissolved therein was mixed with 500 mL of N-methyl pyrrolidone solution containing boron nitride (heat conductivity: 200 W/m·K) dispersed therein to obtain 1000 mL of dispersion in which born nitride is dispersed. Herein the weight ratio of boron nitride to polyvinylidene fluoride in the resultant solution was 9:1. The heat conductive layer had a thickness of 3 μm.

Next, slurry for forming a porous polymer layer was applied onto the surface of the heat conductive layer by using a doctor blade and dried at a temperature of 60° C. for 3 hours to form a porous polymer layer. The slurry for forming a porous polymer layer was prepared as follows. First, 10 g of polyethylene oxide as a polymer was added to 100 g of acetone as a solvent to prepare a polymer solution. Next, 20 g of water as a non-solvent was added to the polymer solution to form slurry for forming a porous polymer layer. While the polymer solution is dried, phase conversion occurs to form pores in the regions occupied by the non-solvent in the portion where phase separation of the non-solvent and polymer occurs. The porosity was 30%. The porous polymer layer had a thickness of 3 μm.

3) Manufacture of Lithium Metal Battery

A porous polyethylene separator having a thickness of 15 μm was interposed between the positive electrode obtained from 1) and the negative electrode obtained from 2) to provide an electrode assembly. The electrode assembly was disposed in a casing and an electrolyte was injected thereto to obtain a lithium metal battery mono-cell. The electrolyte was prepared by dissolving 1M $LiPF_6$ in a mixed solvent containing ethylene carbonate (EC) and ethyl methyl carbonate (EMC) at a volume ratio of 1:1.

Example 2

A lithium metal battery was obtained in the same manner as described in Example 1, except that the negative electrode was obtained by the method described hereinafter.

First, in the same manner as Example 1, a structure including a current collector; a negative electrode active material layer disposed on the current collector; and a heat conductive layer disposed on the negative electrode active material layer was manufactured.

Next, slurry for forming a ceramic layer was applied onto the surface of the heat conductive layer by using a doctor blade, and dried at 60° C. for 3 hours to form a ceramic layer. The slurry for forming a ceramic layer was prepared as follows. At room temperature, $Al_2O_3$ inorganic particles (Japan Light Metal Co., LS235, particle size 500 nm, Vicker's hardness: 17.5 GPa) and a binder (PVDF-HFP) were introduced to acetone at a weight ratio of 9:1, followed by agitation, to prepare slurry for forming a ceramic layer. The ceramic layer had a thickness of 3 μm.

Example 3

A lithium metal battery was obtained in the same manner as described in Example 1, except that the negative electrode was obtained by the method described hereinafter.

First, in the same manner as Example 1, a structure including a current collector; a negative electrode active material layer disposed on the current collector; and a heat conductive layer disposed on the negative electrode active material layer was manufactured.

Next, slurry for forming a porous polymer layer was applied onto the surface of the heat conductive layer by using a doctor blade and dried at a temperature of 60° C. for 3 hours to form a porous polymer layer. The slurry for forming a porous polymer layer was prepared as follows. First, 10 g of polyethylene oxide as a polymer was added to 100 g of acetone as a solvent to prepare a polymer solution. Next, 20 g of water as a non-solvent was added to the polymer solution to form slurry for forming a porous polymer layer. While the polymer solution is dried, phase conversion occurs to form pores in the regions occupied by the non-solvent in the portion where phase separation of the non-solvent and polymer occurs. The porosity was 30%. The porous polymer layer had a thickness of 3 μm.

Finally, slurry for forming a ceramic layer was applied onto the surface of the porous polymer layer by using a doctor blade, and dried at 60° C. for 3 hours to form a ceramic layer. The slurry for forming a ceramic layer was prepared as follows. At room temperature, $Al_2O_3$ inorganic particles (Japan Light Metal Co., LS235, particle size 500 nm, Vicker's hardness: 17.5 GPa) and a binder (PVDF-HFP) were introduced to acetone at a weight ratio of 9:1, followed by agitation, to prepare slurry for forming a ceramic layer. The ceramic layer had a thickness of 3 μm.

Example 4

A lithium metal battery was obtained in the same manner as described in Example 1, except that the negative electrode was obtained by the method described hereinafter.

First, in the same manner as Example 1, a structure including a current collector; a negative electrode active material layer disposed on the current collector; and a heat conductive layer disposed on the negative electrode active material layer was manufactured.

Next, slurry for forming a ceramic layer was applied onto the surface of the heat conductive layer by using a doctor blade, and dried at 60° C. for 3 hours to form a ceramic layer. The slurry for forming a ceramic layer was prepared as follows. At room temperature, $Al_2O_3$ inorganic particles (Japan Light Metal Co., LS235, particle size 500 nm, Vicker's hardness: 17.5 GPa) and a binder (PVDF-HFP) were introduced to acetone at a weight ratio of 9:1, followed by agitation, to prepare slurry for forming a ceramic layer. The ceramic layer had a thickness of 3 μm.

Finally, slurry for forming a porous polymer layer was applied onto the surface of the ceramic layer by using a doctor blade and dried at a temperature of 60° C. for 3 hours to form a porous polymer layer. The slurry for forming a porous polymer layer was prepared as follows. First, 10 g of polyethylene oxide as a polymer was added to 100 g of acetone as a solvent to prepare a polymer solution. Next, 20 g of water as a non-solvent was added to the polymer solution to form slurry for forming a porous polymer layer. While the polymer solution is dried, phase conversion occurs to form pores in the regions occupied by the non-solvent in the portion where phase separation of the non-solvent and polymer occurs. The porosity was 30%. The porous polymer layer had a thickness of 3 μm.

Example 5

A lithium metal battery was obtained in the same manner as described in Example 1, except that the negative electrode was obtained by the method described hereinafter.

Lithium metal foil having a thickness of 20 μm was stacked on copper foil having a thickness of 20 μm as a negative electrode current collector at 100° C. under 0.5 MPa to form a negative electrode active material layer formed on the surface of the current collector.

Next, slurry for forming a heat conductive layer was applied onto the negative electrode active material layer by using a doctor blade and dried at a temperature of 60° C. for 3 hours to form a heat conductive layer. The slurry for forming a heat conductive layer was prepared as follows. First, 500 mL of N-methyl pyrrolidone solution containing polyvinylidene fluoride dissolved therein was mixed with 500 mL of N-methyl pyrrolidone solution containing boron nitride (heat conductivity: 200 W/m·K) dispersed therein to obtain 1000 mL of dispersion in which born nitride is dispersed. Herein the weight ratio of boron nitride to polyvinylidene fluoride in the resultant solution was 9:1. The heat conductive layer had a thickness of 3 μm.

Next, a polyolefin-based porous film (W scope Co., WL11B) as a porous polymer layer was stacked on the surface of the heat conductive layer to a thickness of 3 μm.

Then, slurry for forming a ceramic layer was applied onto the surface of the polyolefin-based porous film by using a doctor blade, and dried at 60° C. for 3 hours to form a ceramic layer. The slurry for forming a ceramic layer was prepared as follows. At room temperature, $Al_2O_3$ inorganic particles (Japan Light Metal Co., LS235, particle size 500 nm, Vicker's hardness: 17.5 GPa) and a binder (PVDF-HFP) were introduced to acetone at a weight ratio of 9:1, followed by agitation, to prepare slurry for forming a ceramic layer. The ceramic layer had a thickness of 3 μm.

Example 5 is an embodiment using a polyolefin-based film as a porous polymer layer. As can be seen from Example 5, even when using a polyolefin-based film, it is possible to provide higher capacity maintenance as compared to Comparative Examples.

However, as can be seen from Examples 3 and 5, use of polyethylene oxide as a porous polymer layer provides a larger amount of electrolyte impregnation as compared to use of a polyolefin-based porous film, and thus shows higher capacity maintenance. It is thought that this is because the polyolefin-based porous film allows impregnation of an electrolyte merely in the pores of the film but the polyethylene oxide-containing porous polymer layer allows polyethylene oxide itself to be impregnated with an electrolyte. In other words, polyethylene oxide itself is impregnated with an electrolyte and swelled.

Comparative Example 1

A lithium metal battery was obtained in the same manner as described in Example 1, except that the negative electrode was obtained by the method described hereinafter.

Lithium metal foil having a thickness of 20 μm was stacked on copper foil having a thickness of 20 μm as a negative electrode current collector at 100° C. under 0.5 MPa to form a negative electrode active material layer formed on the surface of the current collector.

Then, slurry for forming a ceramic layer was applied onto the surface of the negative electrode active material layer by using a doctor blade, and dried at 60° C. for 3 hours to form a ceramic layer. The slurry for forming a ceramic layer was prepared as follows. At room temperature, $ZrO_2$ inorganic particles (Toray Co., particle size 500 nm) and a binder (PVDF-HFP) were introduced to acetone at a weight ratio of 9:1, followed by agitation, to prepare slurry for forming a ceramic layer. The ceramic layer had a thickness of 3 μm.

In the case of Comparative Example 1, only the ceramic layer is present on the surface of the negative electrode active material layer. Since Comparative Example 1 has no heat conductive layer, the heat generated by lithium ion intercalation/deintercalation cannot be dispersed homogeneously. Therefore, swelling may occur due to the emitted heat, and dendrite is formed to a large thickness non-homogeneously. As a result, Comparative Example 1 causes degradation of the capacity maintenance of a lithium metal battery mono-cell.

Comparative Example 2

A lithium metal battery was obtained in the same manner as described in Example 1, except that the negative electrode was obtained by the method described hereinafter.

Lithium metal foil having a thickness of 20 μm was stacked on copper foil having a thickness of 20 μm as a negative electrode current collector at 100° C. under 0.5 MPa to form a negative electrode active material layer formed on the surface of the current collector.

Next, slurry for forming a heat conductive layer was applied onto the negative electrode active material layer by using a doctor blade and dried at a temperature of 60° C. for 3 hours to form a heat conductive layer. The slurry for forming a heat conductive layer was prepared as follows. First, 500 mL of PVDF/N-methyl pyrrolidone solution was mixed with 500 mL of boron nitride/N-methyl pyrrolidone solution to obtain a dispersion in which born nitride is dispersed. Herein the weight ratio of boron nitride to polyvinylidene fluoride in the resultant solution was 9:1. The heat conductive layer had a thickness of 3 μm.

Comparative Example 2 includes a heat conductive layer on the surface of the negative electrode material layer only. As can be seen from Table 1, Comparative Example 2 shows high heat conductivity but allows impregnation of the electrode assembly with a small amount of electrolyte. Comparative Example 2 includes the heat conductive layer alone, and thus shows higher heat conductivity as compared to Examples having a multi-layer structure. However, even though Comparative Example 2 shows the highest heat conductivity, it shows low capacity maintenance. As a result, it seems that heat conductivity shows convergence when it reaches about 100 W/m·K.

Comparative Example 3

A lithium metal battery was obtained in the same manner as described in Example 1, except that the negative electrode was obtained by the method described hereinafter.

Lithium metal foil having a thickness of 20 μm was stacked on copper foil having a thickness of 20 μm as a negative electrode current collector at 100° C. under 0.5 MPa to form a negative electrode active material layer formed on the surface of the current collector.

Next, slurry for forming a porous polymer layer was applied onto the surface of the negative electrode active material layer by using a doctor blade and dried at a temperature of 60° C. for 3 hours to form a porous polymer layer. The slurry for forming a porous polymer layer was prepared as follows. First, 10 g of polyethylene oxide as a polymer was added to 100 g of acetone as a solvent to prepare a polymer solution. Next, 20 g of water as a non-solvent was added to the polymer solution to form slurry for forming a porous polymer layer. While the polymer solution is dried, phase conversion occurs to form pores in the regions occupied by the non-solvent in the portion where phase separation of the non-solvent and polymer occurs. The porosity was 30%. The porous polymer layer had a thickness of 3 μm.

Then, slurry for forming a ceramic layer was applied onto the surface of the porous polymer layer by using a doctor blade, and dried at 60° C. for 3 hours to form a ceramic layer. The slurry for forming a ceramic layer was prepared as follows. At room temperature, $ZrO_2$ inorganic particles (Toray Co., particle size 500 nm) and a binder (PVDF-HFP) were introduced to acetone at a weight ratio of 9:1, followed by agitation, to prepare slurry for forming a ceramic layer. The ceramic layer had a thickness of 3 μm.

Comparative Example 3 has no heat conductive layer. Although Comparative Example 3 shows a relatively higher amount of electrolyte impregnation, it has no heat conductive layer, and thus cannot allow homogeneous growth of lithium dendrite. In addition, the heat generated by lithium intercalation/deintercalation cannot be dispersed homogeneously, resulting in an increase in thickness of the negative electrode.

Comparative Example 4

A lithium metal battery was obtained in the same manner as described in Example 1, except that the negative electrode was obtained by the method described hereinafter.

Lithium metal foil having a thickness of 20 μm was stacked on copper foil having a thickness of 20 μm as a negative electrode current collector at 100° C. under 0.5 MPa to form a negative electrode active material layer formed on the surface of the current collector.

Next, slurry for forming a ceramic layer was applied onto the surface of the negative electrode active material layer by using a doctor blade, and dried at 60° C. for 3 hours to form a ceramic layer. The slurry for forming a ceramic layer was prepared as follows. At room temperature, $Al_2O_3$ inorganic particles (Japan Light Metal Co., LS235, particle size 500 nm) and a binder (PVDF-HFP) were introduced to acetone at a weight ratio of 9:1, followed by agitation, to prepare slurry for forming a ceramic layer. The ceramic layer had a thickness of 3 μm.

Then, slurry for forming a heat conductive layer was applied onto the ceramic layer by using a doctor blade and dried at a temperature of 60° C. for 3 hours to form a heat conductive layer. The slurry for forming a heat conductive layer was prepared as follows. First, 500 mL of N-methyl pyrrolidone solution containing polyvinylidene fluoride dissolved therein was mixed with 500 mL of N-methyl pyrrolidone solution containing boron nitride (heat conductivity: 200 W/m·K) dispersed therein to obtain 1000 mL of a dispersion in which born nitride is dispersed. Herein the weight ratio of boron nitride to polyvinylidene fluoride in the resultant solution was 9:1. The heat conductive layer had a thickness of 3 μm.

In Comparative Example 4, the heat conductive layer does not directly face the negative electrode active material layer but is disposed on the outermost part of the negative electrode for a lithium metal battery. In the case of Comparative Example 4, the heat conductive layer cannot allow homogeneous growth of lithium dendrite formed on the negative electrode active material layer. Thus, Comparative Example 4 shows a capacity maintenance of 65%, which is significantly lower as compared to Examples.

Comparative Example 5

A lithium metal battery was obtained in the same manner as described in Example 1, except that the negative electrode was obtained by the method described hereinafter.

Lithium metal foil having a thickness of 20 μm was stacked on copper foil having a thickness of 20 μm as a negative electrode current collector at 100° C. under 0.5 MPa to form a negative electrode active material layer formed on the surface of the current collector.

Next, slurry for forming a porous polymer layer was applied onto the surface of the negative electrode active material layer by using a doctor blade and dried at a temperature of 60° C. for 3 hours to form a porous polymer layer. The slurry for forming a porous polymer layer was prepared as follows. First, 10 g of polyethylene oxide as a polymer was added to 100 g of acetone as a solvent to prepare a polymer solution. Next, 20 g of water as a non-solvent was added to the polymer solution to form slurry for forming a porous polymer layer. While the polymer solution is dried, phase conversion occurs to form pores in the regions occupied by the non-solvent in the portion where phase separation of the non-solvent and polymer occurs. The porosity was 30%. The porous polymer layer had a thickness of 3 µm.

Then, slurry for forming a ceramic layer was applied onto the surface of the porous polymer layer by using a doctor blade, and dried at 60° C. for 3 hours to form a ceramic layer. The slurry for forming a ceramic layer was prepared as follows. At room temperature, $Al_2O_3$ inorganic particles (Japan Light Metal Co., LS235, particle size 500 nm) and a binder (PVDF-HFP) were introduced to acetone at a weight ratio of 9:1, followed by agitation, to prepare slurry for forming a ceramic layer. The ceramic layer had a thickness of 3 µm.

Finally, slurry for forming a heat conductive layer was applied onto the ceramic layer by using a doctor blade and dried at a temperature of 60° C. for 3 hours to form a heat conductive layer. The slurry for forming a heat conductive layer was prepared as follows. First, 500 mL of N-methyl pyrrolidone solution containing polyvinylidene fluoride dissolved therein was mixed with 500 mL of N-methyl pyrrolidone solution containing boron nitride (heat conductivity: 200 W/m·K) dispersed therein to obtain 1000 mL of a dispersion in which born nitride is dispersed. Herein the weight ratio of boron nitride to polyvinylidene fluoride in the resultant solution was 9:1. The heat conductive layer had a thickness of 3 µm.

In Comparative Example 5, the heat conductive layer does not directly face the negative electrode active material layer but is disposed on the outermost part of the negative electrode for a lithium metal battery. In the case of Comparative Example 5, the heat conductive layer cannot allow homogeneous growth of lithium dendrite formed on the negative electrode active material layer. Thus, Comparative Example 5 shows a capacity maintenance of 68%, which is significantly lower as compared to Examples.

Test Examples (1) Determination of Capacity maintenance

Each of the lithium metal batteries according to Examples and Comparative Examples was charged to 4.25V at 0.3 C in a constant current (CC)-constant voltage (CV) mode and discharged to 3V at 0.5 C in a CC mode, at room temperature. This was repeated for 200 cycles to determine the capacity maintenance. The results are shown in the following Table 1.

(2) Determination of Electrode Thickness after Repeating Cycles

After determining the capacity maintenance, each of the lithium metal batteries according to Examples and Comparative Examples was disassembled to observe a change in thickness of the negative electrode. The results are shown in the following Table 1.

(3) Determination of Heat Conductivity

The outermost surface of each of the lithium metal batteries according to Examples and Comparative Examples was surrounded with copper foil and the heat conductivity of each battery was determined by the laser flash method. The results are shown in the following Table 1.

(4) Determination of Electrolyte Impregnation Amount

An electrode assembly including each of the negative electrodes according to

Examples and Comparative Examples was disposed in a casing, and the weight of the electrode assembly was measured before/after the injection of an electrolyte to determine the electrolyte impregnation amount. The results are shown in the following Table 1.

TABLE 1

| | Constitution | Capacity maintenance (%) (after 200 cycles) | Negative electrode thickness (µm) (after 200 cycles) | Heat conductivity (W/m·K) | Electrolyte impregnation amount (mg) |
|---|---|---|---|---|---|
| Example 1 | Heat conductive layer-Porous polymer layer | 82 | 100 | 100 | 600 |
| Example 2 | Heat conductive layer-Ceramic layer | 80 | 95 | 100 | 400 |
| Example 3 | Heat conductive layer-Porous polymer layer-Ceramic layer | 92 | 80 | 90 | 700 |
| Example 4 | Heat conductive layer-Ceramic layer-Porous polymer layer | 85 | 82 | 91 | 660 |
| Example 5 | Heat conductive layer-Porous polymer layer-Ceramic layer | 84 | 110 | 92 | 600 |
| Comp. Ex. 1 | Ceramic layer | 30 | 210 | 30 | 200 |
| Comp. Ex. 2 | Heat conductive layer | 45 | 180 | 200 | 250 |
| Comp. Ex. 3 | Porous polymer layer-Ceramic layer | 50 | 170 | 5 | 500 |
| Comp. Ex. 4 | Ceramic layer-Heat conductive layer | 65 | 130 | 50 | 400 |
| Comp. Ex. 5 | Porous polymer layer-Ceramic layer-Heat conductive layer | 68 | 135 | 55 | 680 |

(5) Method for Determining Porosity in Porous Polymer Layer

In each of the negative electrodes according to Examples and Comparative Examples, the porosity in the porous polymer layer was calculated according to the following Formula 1. Particularly, the true density (for example, PVDF has a true density of 1.78) of the polymer used for each porous polymer layer and the area, thickness and weight of the porous polymer layer were used to calculate packing density, and then porosity was calculated from the following Formula 1.

$$\text{Porosity } (\%) = \left(1 - \frac{\text{Packing density}}{\text{True density}}\right) \times 100 \quad \text{[Formula 1]}$$

Each of Comparative Examples 1 and 2 has a monolayer structure merely including a ceramic layer or a heat conductive layer on a negative electrode active material layer. Meanwhile, Examples 1 and 2 has a bi-layer structure including a heat conductive layer and a porous polymer layer, or a heat conductive layer and a ceramic layer, while Examples 3-5 have a tri-layer structure including a heat conductive layer, a porous polymer layer and a ceramic layer.

As can be seen from Table 1, from the monolayer to the bi-layer and tri-layer, life characteristics are enhanced. It is thought that this is because the presence of a protective layer increases electrolyte impregnation amount.

What is claimed is:

1. A negative electrode for a lithium metal battery, comprising:
   a current collector;
   a negative electrode active material layer formed on a surface of the current collector;
   a heat conductive layer formed on a surface of the negative electrode active material layer, the heat conductive layer comprising a heat conductive material having a heat conductivity of 25 W/m·K to 500 W/m·K; and
   a protective layer formed on a surface of the heat conductive layer, wherein the protective layer comprises a porous polymer layer and a ceramic layer comprising inorganic particles formed of an inorganic material having a Vicker's hardness of 10 GPa or more, wherein the porous polymer layer is formed on the surface of the heat conductive layer, and the ceramic layer is formed on the surface of the polymer layer,
   wherein the porous polymer layer consists of a polymer selected from the group consisting of polyvinylidene fluoride, polyvinyl chloride, polyvinylidene fluoride-co-hexafluoropropylene, polyvinylidene fluoride-co-trichloroethylene, polyethylhexyl acrylate, polybutyl acrylate, polyacrylonitrile, polyvinyl pyrrolidone, polyvinylidene fluoride, polyethylene oxide, polypropylene oxide, and polyarylate, and
   wherein the negative electrode active material comprises lithium metal and the heat conductive material is a different material than the inorganic material of the inorganic particles.

2. The negative electrode for the lithium metal battery according to claim 1, wherein the heat conductive material is a heat conductive inorganic material.

3. The negative electrode for the lithium metal battery according to claim 2, wherein the heat conductive inorganic material comprises at least one selected from the group consisting of boron nitride, magnesium oxide, aluminum oxide, beryllium oxide, aluminum nitride and combinations thereof.

4. The negative electrode for the lithium metal battery according to claim 1, wherein the inorganic material of the inorganic particles is at least one selected from the group consisting of $SiO_2$, $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_{3-x}PbTiO_3$ (PMNPT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, AlO(OH), LLZO (Lithium Lanthanum Zirconium Oxide), $ZO_3$, $Si_3N_4$, TiC, $TiO_2$, SiC and combinations thereof.

5. The negative electrode for the lithium metal battery according to claim 1, wherein the negative electrode active material layer comprises, as a negative electrode active material, at least one selected from the group consisting of alkali metals, alkaline earth metals, Group 3B metals, transition metals and combinations thereof.

6. The negative electrode for the lithium metal battery according to claim 1, wherein the heat conductive layer has a thickness of 1 μm to 10 μm.

7. The negative electrode for the lithium metal battery according to claim 1, wherein the porous polymer layer has a thickness of 1 μm to 10 μm.

8. The negative electrode for the lithium metal battery according to claim 1, wherein the ceramic layer has a thickness of 1 μm to 10 μm.

9. The negative electrode for the lithium metal battery according to claim 1, wherein the heat conductive material has a heat conductivity of 30 W/m·K to 200 W/m·K.

10. An electrochemical device comprising the negative electrode as defined in claim 1.

11. The electrochemical device according to claim 10, wherein the electrochemical device is a lithium metal battery.

12. The electrochemical device according to claim 11, wherein the lithium metal battery comprises, as a negative electrode active material, at least one selected from the group consisting of alkali metals, alkaline earth metals, Group 3B metals, transition metals and combinations thereof.

* * * * *